(12) United States Patent
Rekow et al.

(10) Patent No.: US 7,062,381 B1
(45) Date of Patent: Jun. 13, 2006

(54) METHOD AND SYSTEM FOR DETERMINING RELATIVE POSITION OF MOBILE VEHICLES

(75) Inventors: Andrew Karl Wilhelm Rekow, Cedar Falls, IA (US); Scott Adam Stephens, Phoenix, AZ (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/217,020

(22) Filed: Aug. 30, 2005

(51) Int. Cl.
*G05D 1/02* (2006.01)

(52) U.S. Cl. .................. 701/300; 342/126; 342/133; 367/127; 367/129; 367/907; 367/909

(58) Field of Classification Search .................. 701/23, 701/24, 25, 26, 200, 202, 207, 210, 216; 367/127, 128, 129, 907, 909; 342/126, 127, 342/133, 109, 115, 118, 342
See application file for complete search history.

(56) References Cited

U.S. PATENT DOCUMENTS

| 4,710,020 | A | 12/1987 | Maddox et al. |
|---|---|---|---|
| 4,829,442 | A | 5/1989 | Kadonoff et al. |
| 4,833,480 | A | 5/1989 | Palmer et al. |
| 4,873,449 | A | 10/1989 | Paramythioti et al. |
| 5,375,059 | A | 12/1994 | Kyrtsos et al. |
| 5,390,125 | A | 2/1995 | Sennott et al. |
| 5,438,517 | A | 8/1995 | Sennott et al. |
| 5,610,815 | A | 3/1997 | Gudat et al. |
| 5,640,323 | A | 6/1997 | Kleimenhagen et al. |
| 5,657,226 | A | 8/1997 | Shin et al. |
| 5,657,317 | A | 8/1997 | Mahany et al. |
| 5,874,918 | A | 2/1999 | Czarnecki et al. |
| 5,933,079 | A | 8/1999 | Frink |
| 5,982,164 | A | 11/1999 | Czarnecki et al. |
| 5,986,602 | A | 11/1999 | Frink |
| 6,011,974 | A | 1/2000 | Cedervall et al. |
| 6,072,421 | A | 6/2000 | Fukae et al. |

(Continued)

FOREIGN PATENT DOCUMENTS

CA     1271546     7/1990

OTHER PUBLICATIONS

H. Edelsbruneer and T.S. Tan, *Quadratic time algorithm for the minmax length triangulation*, Proceedings of the 32$^{nd}$ Annual Symposium on Foundations of Computer Science, pp. 414-423, 1991, San Juan Puerto Rico.

(Continued)

*Primary Examiner*—Richard M. Camby

(57) ABSTRACT

A primary transceiver of a primary vehicle transmits a first transmission signal to a first transponder and a second transponder associated with a secondary vehicle. A first transponder antenna and a second transponder antenna are associated with secondary vehicular reference points. Upon receipt of the first transmission signal, the first transponder transmits a second transmission signal to a first beacon of the primary vehicle and the primary transceiver. A transmitter antenna and the first beacon antenna are associated with primary vehicle reference points. Upon receipt of the first transmission signal, the second transponder transmits a third transmission signal to the first beacon and the primary transceiver. A data processor or estimator determines propagation times associated with the first transmission signal, the second transmission signal, and the third transmission signal. The data processor or an estimator estimates a relative position of the primary vehicle with respect to the secondary vehicle based on the primary vehicular reference points, the secondary vehicular reference points, and the determined propagation times.

20 Claims, 9 Drawing Sheets

U.S. PATENT DOCUMENTS

| | | |
|---|---|---|
| 6,125,135 A | 9/2000 | Woo et al. |
| 6,212,448 B1 | 4/2001 | Xydis |
| 6,236,352 B1 * | 5/2001 | Walmsley ................... 342/118 |
| 6,424,264 B1 | 7/2002 | Giraldin et al. |
| 6,426,716 B1 * | 7/2002 | McEwan ..................... 342/28 |
| 6,427,079 B1 | 7/2002 | Schneider et al. |
| 6,459,966 B1 | 10/2002 | Nakano et al. |
| 6,489,917 B1 | 12/2002 | Geisheimer et al. |
| 6,556,942 B1 | 4/2003 | Smith |
| 6,614,721 B1 | 9/2003 | Bokhour |
| 6,707,378 B1 * | 3/2004 | MacNeille et al. ......... 340/435 |
| 7,009,552 B1 * | 3/2006 | Sako ......................... 342/118 |
| 2001/0022506 A1 | 9/2001 | Peless et al. |
| 2001/0027360 A1 | 10/2001 | Nakano et al. |
| 2001/0051527 A1 | 12/2001 | Kuwahara et al. |
| 2002/0097181 A1 | 7/2002 | Chou et al. |
| 2003/0005030 A1 | 1/2003 | Sutton et al. |
| 2003/0007473 A1 | 1/2003 | Strong et al. |
| 2004/0032363 A1 | 2/2004 | Schantz et al. |
| 2005/0002481 A1 | 1/2005 | Woo et al. |

OTHER PUBLICATIONS

F. van Diggelen and A. Brown, *Mathematical Aspects of GPS Raim*, IEEE Position Location and Navigation Symposium, pp. 733-738, 1994, Las Vegas, NV, USA.

* cited by examiner

METHOD AND SYSTEM FOR DETERMINING RELATIVE POSITION OF MOBILE VEHICLES

FIELD OF THE INVENTION

This invention relates to a method and system for determining the relative position of mobile vehicles.

BACKGROUND OF THE INVENTION

A primary vehicle may be a manned or an unmanned vehicle. In the case of a manned vehicle, an operator may use his or her judgment and perception to guide or navigate the vehicle in its environment. In the case of an unmanned vehicle, a guidance or navigation system may guide or navigate the vehicle in its environment. One or more secondary vehicles may track the path of the primary vehicle in a coordinated manner for military, agricultural or commercial activities. Thus, there is a need to maintain a desired degree of alignment and coordination over time between a primary position of primary vehicle and secondary positions of one or more secondary vehicles.

SUMMARY OF THE INVENTION

A primary transceiver of a primary vehicle transmits a first transmission signal to a first transponder and a second transponder associated with a secondary vehicle. A first transponder antenna and a second transponder antenna are associated with secondary vehicular reference points that are spaced apart from each other. Upon receipt of the first transmission signal, the first transponder transmits a second transmission signal to a first beacon of the primary vehicle and the primary transceiver. A primary transceiver antenna and the first beacon antenna are associated with primary vehicle reference points that are spaced apart from each other. Upon receipt of the first transmission signal, the second transponder transmits a third transmission signal to the first beacon and the primary transceiver. A data processor or estimator determines propagation times associated with the first transmission signal, the second transmission signal, and the third transmission signal. The data processor or an estimator estimates a relative position of the primary vehicle with respect to the secondary vehicle based on the primary vehicular reference points, the secondary vehicular reference points, and the determined propagation times.

DESCRIPTION OF THE PREFERRED EMBODIMENT

As used herein the term transponder or beacon shall mean a device that upon receipt of a designated electromagnetic signal emits a response electromagnetic signal that may be used for the detection and location of a primary vehicle with respect to a secondary vehicle. The response electromagnetic signal may represent a repeating or re-broadcasting of the received designated electromagnetic signal (e.g., on a different channel, frequency, time slot or coded signal), a modification or modulation of a received signal at baseband or an intermediate frequency, or a newly generated or modulated electromagnetic signal. Although the beacon or transponder is preferably active, in alternate embodiments passive repeaters or passive beacons may be used, provided the effective radiated power of the transmission and spatial separation are appropriate.

Figure 1:
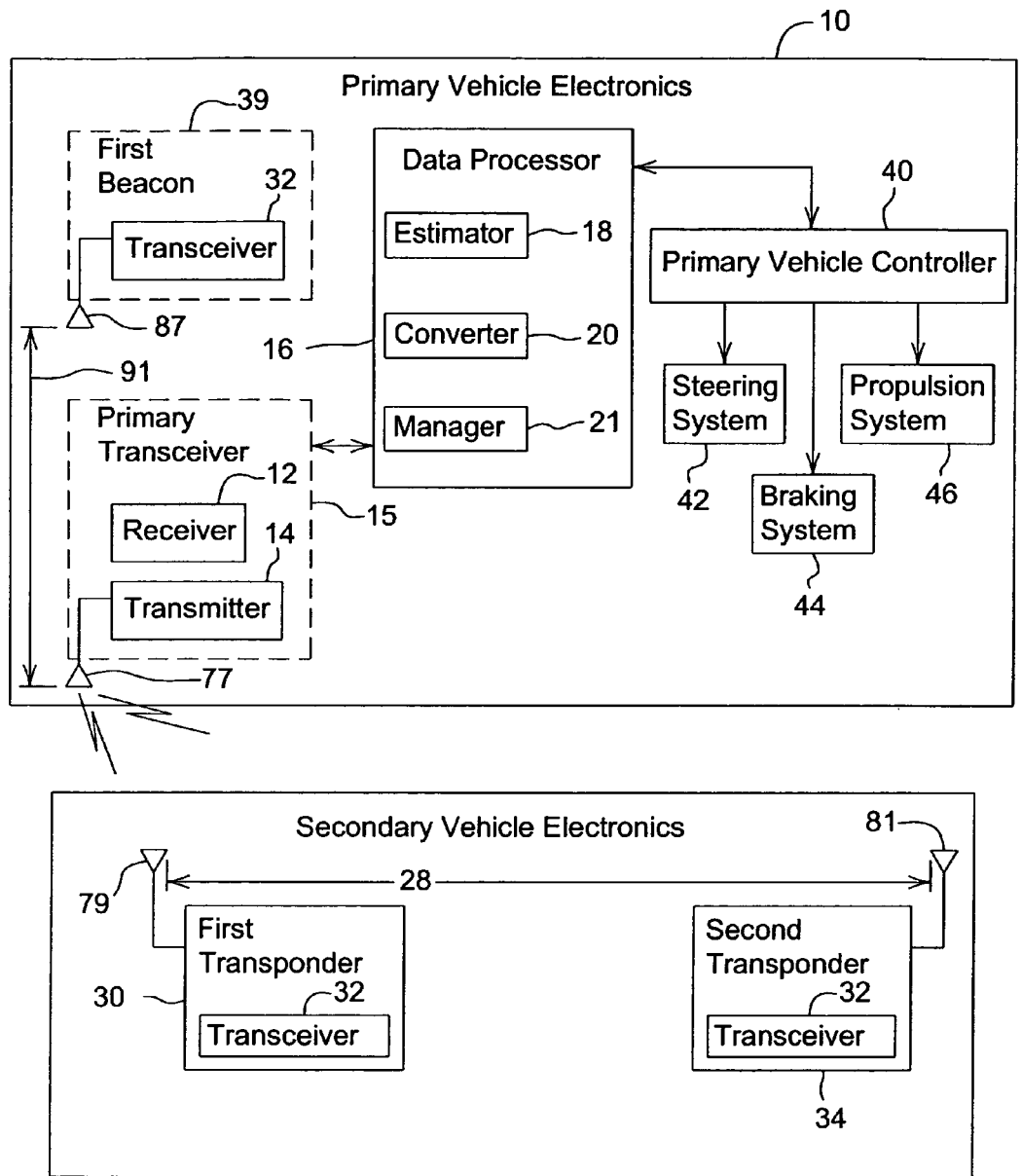
FIG. 1 is a block diagram of one embodiment of a system for determining the relative position (and orientation) of a primary vehicle with respect to a secondary vehicle in accordance with the invention.

In accordance with one embodiment, FIG. 1 illustrates a system 11 for tracking a position (or position and heading) of a primary vehicle with respect to a secondary vehicle. The position of a vehicle may be defined in two or three dimensional coordinates (e.g., Cartesian coordinates, polar coordinates, latitude or longitude). The heading or orientation relates to the instantaneous direction of travel of the vehicle. The heading or orientation may be defined with reference to due North, magnetic North, a radio frequency beacon, a celestial beacon, or another reference point or bearing. Because a series of positions of the vehicle over time establish the path, velocity and acceleration of the vehicle, the system 11 may be adapted such the secondary vehicle tracks the path, velocity and/or acceleration of the primary vehicle, or vice versa.

The system 11 comprises primary vehicle electronics 10 and secondary vehicle electronics 26. The primary vehicle electronics 10 are associated with the primary vehicle, whereas the secondary vehicle electronics 26 are associated with the secondary vehicle.

The primary vehicle electronics 10 comprises a primary transceiver 15 and a primary vehicle controller 40 that communicate with a data processor 16. In turn, the primary vehicle controller 40 is arranged to communicate with one or more of the following via a logical data path or a physical data path (e.g., a databus): a steering system 42, a braking system 44, and a propulsion system 46. The primary vehicle electronics 10 further comprises a first beacon 39. The first beacon 39 is associated with a first beacon antenna 87 which is spaced apart from a primary transceiver antenna 77 or transmitter antenna of the transmitter 14 by a known primary spatial separation 91. The first beacon antenna 87 and primary transceiver antenna 77 are associated with primary vehicle reference points (e.g., in two dimensional or three dimensional coordinates) with reference to the primary vehicle (e.g., vehicle reference coordinate frame).

The secondary vehicle electronics 26 comprises a first transponder 30 and a second transponder 34. In one embodiment, the first transponder 30 and second transponder 34 each comprise a transceiver 32 or the combination of a transmitter and a receiver. The first transponder antenna 79 and the second transponder antenna 81 are separated by a known secondary spatial separation 28. The first transponder antenna 79 and the second transponder antenna 81 are associated with secondary vehicle reference points (e.g., in two dimensional or three dimensional coordinates) with reference to the secondary vehicle (e.g., vehicle coordinate reference frame). Each transponder may apply selective modulation or coding (e.g., phase shift keying, frequency shift keying, or pseudo-random noise codes) to its transmitted or emitted signal to facilitate distinguishing one transmission signal (e.g., transponder transmission signal) from another.

Turning to the primary vehicle electronics 10 in greater detail, the first beacon 39 comprises a transceiver 32 or the combination of a transmitter and a receiver. The primary transceiver 15 may comprise a transceiver or the combination of a receiver 12 and a transmitter 14. The first beacon 39 and primary transceiver 15 each may apply selective modulation or coding to its transmitted or emitted signal to facilitate distinguishing transmission signals from one another. In one embodiment, the data processor 16 may comprise an estimator 18, a converter 20, and a manager 21.

The primary vehicle controller 40 may generate control signals for the steering system 42, a braking system 44, and a propulsion system 46 that are consistent with tracking a path plan or desired path. For example, the control signals may comprise a steering control signal or data message that is time dependent and defines a steering angle of the steering shaft; a braking control signal or data message that defines the amount of deceleration, hydraulic pressure, or braking friction applied to brakes; a propulsion control signal or data message that controls a throttle setting, a fuel flow, a fuel injection system, vehicular speed or vehicular acceleration. If the primary vehicle is propelled by an electric drive or motor, the propulsion control signal or data message may control electrical energy, electrical current, or electrical voltage to the electric drive or motor.

The steering system 42 may comprise an electrically controlled hydraulic steering system, an electrically driven rack-and-pinion steering, an Ackerman steering system, or another steering system. The braking system 44 may comprise an electrically controlled hydraulic braking system, or another electrically controlled friction braking system. The propulsion system 46 may comprise an internal combustion engine, an internal combustion engine-electric hybrid system, an electric drive system, or the like.

At the primary vehicle electronics 10, the first beacon or primary transceiver 15 receives the transmission signal and provides the demodulated or decoded signal to the data processor 16. The data processor 16 or estimator 18 estimates a relative position or location (or relative position and relative heading) of the secondary vehicle with respect to the primary vehicle based on the elapsed propagation time associated with one or more of the following propagation paths between reference points (e.g., coincident with antennas (77, 87, 79 and 81)) on the vehicles: (1) an outgoing propagation path from the primary vehicle to the secondary vehicle, (2) an incoming propagation path from the secondary vehicle to the primary vehicle, (3) an outgoing propagation path from the secondary vehicle to the primary vehicle, or (4) an incoming propagation path from the primary vehicle to the secondary vehicle.

The data processor 16 may be configured in several different ways. In a first configuration of the data processor 16, the data processor 16 may process the elapsed propagation times directly, rather than converting them to corresponding distances. Under the first configuration, the converter 20 is not used and may be deleted. In a second configuration, of the data processor 16, the converter 20 is used to convert the elapsed propagation times into corresponding distances between reference points (e.g., spatially coincident with the antennas (77, 87, 97, and 81)).

If the converter 20 is used, the converter 20 may convert each elapsed propagation time into a radius or distance based on the following equation: distance=c*t, where c=3× $10^8$ meters/seconds (or the speed of light), t=elapsed time or propagation time, and distance is distance in meters. If the round trip propagation time is used as the elapsed time between a primary reference point (e.g., primary transceiver antenna 77) on the primary vehicle and a secondary reference point (e.g., first transponder antenna 79) on a secondary vehicle, the distance (d) is divided by two to obtain the distance or radius between the reference points. Further, for active transponders or active beacons, there may be a time or distance deduction for bias or processing lag within each transponder, transceiver or beacon. The data processor 16 may be configured (a) to use a one-way propagation time from the primary transceiver 15 to the first transponder 30 and a one-way propagation time from the primary transceiver 15 to the second transponder 34, or (b) to use a two-way or round-trip propagation time from the primary transceiver 15 to the first transponder 30 or a two way or round-trip propagation time from the primary transceiver 15 to the second transponder 34.

The manager 21 organizes the propagation times (or the corresponding distances) that are collected by the primary transceiver 15. The propagation times (or the corresponding distances) may be organized by (a) substantially concurrent or contemporaneous reception or transmission times, (b) a sequence of reception or transmission times, (c) signal identifiers, or any of the foregoing. The collected propagation times may be time stamped to indicate the data collection time, or may be otherwise indexed to a reference clock or timer. Further, the first transmission signal, the second transmission signal, and the third transmission signals may be uniquely coded, modulated or otherwise structured to uniquely distinguish one transmission signal from another. For example, the first transmission signal, the second transmission signal and the third transmission signal may be associated with a first signal identifier, a second signal identifier, and a third signal identifier, respectively.

The propagation times may be sampled or collected at regular intervals. For example, in one configuration, the propagation times may be sampled or collected at rate greater than or equal to 5 Hz. In another configuration, the propagation times may be sampled or collected at a rate of 100 Hz or greater. Advantageously, the sampling rate of 100 Hz or greater is well-suited for collision avoidance and maintaining a desired spatial separation between the primary vehicle and secondary vehicle.

The collected propagation times may include a first propagation time, a second propagation time, a third propagation time, and a fourth propagation time. The first propagation time is the delay associated with propagation of the electromagnetic signal between the primary transceiver 15 (e.g., the primary transceiver antenna 77) and the first transponder 30 (e.g., the first transponder antenna 79), whereas the second propagation time is the delay associated with the propagation of the electromagnetic signal between the primary transceiver 15 (e.g., the primary transceiver antenna 77) and the second transponder 34 (e.g., the second transponder antenna 81).

The first propagation time is generally proportional to a first distance between a first transponder antenna 79 and a primary transceiver antenna 77; the second propagation time is generally proportional to a second distance between the second transponder antenna 81 and the primary transceiver antenna 77. The first propagation time and the second propagation time establish a first radius (or are proportional to a radius of) the primary vehicle with respect to a secondary vehicle. For example, the secondary vehicle could potentially be located anywhere within the first radius (e.g., as defined above) about the primary transceiver antenna 77, where the first radius bisects the first transponder antenna 79 and a second transponder antenna 81. The third propagation time, the fourth propagation time or both, may be used to resolve the ambiguity of where the secondary vehicle lies with respect to the first radius. However, supplemental information (e.g., location-determining receiver data, machine vision data, optical data, or range finder) may be required to determine whether the secondary vehicle is on the right side or left side of the vehicle or has another respective position.

In an alternative embodiment, an output of an optical or laser range finder is coupled to the data processor 16 to resolve any remaining ambiguity in the relative positions of the primary vehicle and secondary vehicle.

Figure 2:
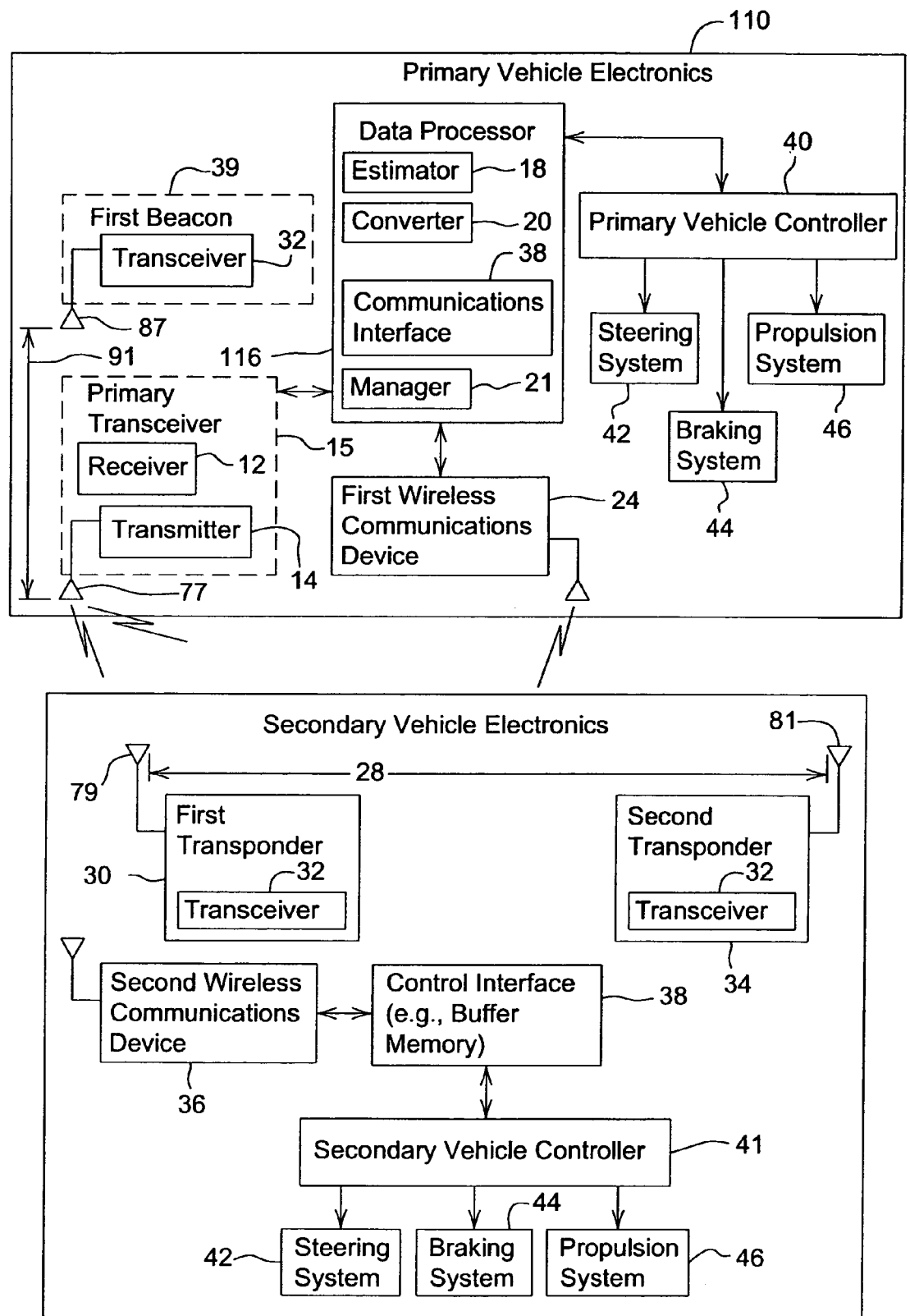
FIG. 2 is a block diagram of another embodiment of a system for determining the relative position (and orientation) of a primary vehicle with respect to a secondary vehicle.

The system 111 of FIG. 2 is similar to the system 11 of FIG. 1, except the system of FIG. 2 includes additional components associated with the primary vehicle electronics 110 and the secondary vehicle electronics 126. The additional components of the primary vehicle electronics 110 includes a first wireless communications device 24 and a communications interface 38. The additional components of the secondary vehicle electronics 126 include a second wireless communications device 36, a control interface 38, a secondary vehicle controller 41, a steering system 42, a braking system 44, and a propulsion system 46. Like reference numbers in FIG. 1 and FIG. 2 indicate like elements.

The communications interface 38 supports communications of one or more of the following: timing synchronization data, distance data, temporal data, relative position data, and relative heading data. The communications interface 38 facilitates the communication of any of the foregoing data to the secondary vehicle electronics 26 via a first wireless communications device 24 and a second wireless communications device 36 associated with the primary vehicle and the secondary vehicle, respectively. The relative position data means the relative position of the primary vehicle to the secondary vehicle, which may be referenced to one or more reference points associated with the vehicle. The relative heading data means the relative heading (e.g. azimuth or angular heading) of the primary vehicle with respect to the secondary vehicle. Timing synchronization data may be used to coordinate reference clocks or oscillators (e.g., local precision oscillator or rubidium crystal oscillators) to facilitate accurate temporal measurements of transmission times and reception times of electromagnetic signals transmitted between the primary vehicle and second vehicle.

The primary vehicle electronics 110 may exchange position data (e.g., position data, heading data, or orientation data) on a one-way or two-way basis with the secondary vehicle electronics 126 via a communications link established between the first wireless communications device 24 and the second wireless communications device 36. The position data may relate to the bearing, heading, position, coordinates, path, velocity, acceleration or other indication of the position of the primary vehicle, the secondary vehicle, or both. Further, the position data may comprise a relative bearing, a relative heading, relative coordinates, relative velocity, relative acceleration, or other relative positional indicator with regards to the primary vehicle and the secondary vehicle.

The second wireless communications device 36 is coupled to a control interface 38. In turn, the control interface 38 is coupled to a secondary vehicle controller 41. The secondary vehicle controller 41 may send control signals to one or more of the secondary devices via a logical data path or a physical data path (e.g., a databus): a steering system 42, a braking system 44, and propulsion system 46. At the secondary vehicle electronics 26, the control interface 38 receives the distance data, temporal data, or relative position data and provides it to the secondary vehicle controller 41.

In one configuration, the secondary vehicle controller 41 may generate control signals for the steering system 42, a braking system 44, and a propulsion system 46 that are consistent with tracking a path plan, or tracking a primary position and primary heading of the vehicle. For example, the control signals may comprise a steering control signal or data message that is time dependent and defines a steering angle of the steering shaft; a braking control signal or data message that defines the amount of deceleration, hydraulic pressure, or braking friction applied to brakes; a propulsion control signal or data message that controls a throttle setting, a fuel flow, a fuel injection system, vehicular speed or vehicular acceleration. If the vehicle is propelled by an electric drive or motor, the propulsion control signal or data message may control electrical energy, electrical current, or electrical voltage to the electric drive or motor.

In another configuration, the secondary vehicle controller 41 may direct the vehicle to maintain a safe or uniform distance and/or heading from the primary vehicle or to track the path of the primary vehicle. For example, the vehicle controller 41 may command the steering system 42 to track the path of the primary vehicle and the propulsion system 46 to track the acceleration, speed or velocity of the primary vehicle.

In one embodiment, the secondary vehicle may track a primary position and primary heading of a primary vehicle with a minimal lag time for data processing and control. Although the primary vehicle may be regarded as a lead vehicle and the secondary vehicle may be regarded as a following or trailing vehicle, the secondary vehicle may track the primary vehicle in a side-by-side manner, or vice versa.

Figure 3:
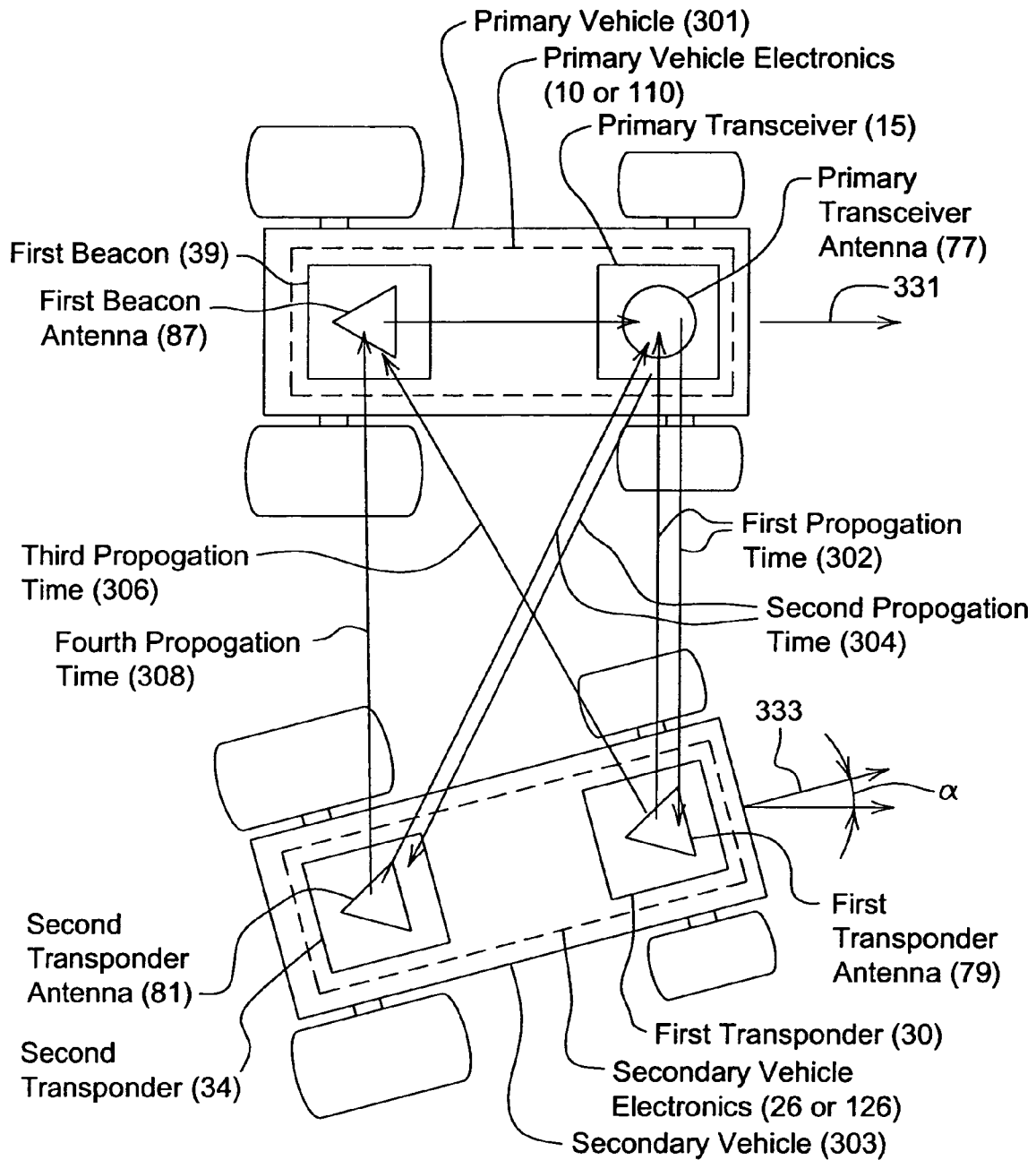
FIG. 3 is an illustrative diagram of a top view of a secondary vehicle generally tracking a path of a primary vehicle.

FIG. 3 shows a top view and a block diagram representation of the primary vehicle 301 and the secondary vehicle 303. Although the antennas (77, 79, 81, 87) may be positioned differently than shown and still fall within the scope of the invention, as shown in FIG. 3 the primary vehicle 301 includes a primary transceiver antenna 77 that is mounted forward with respect to a first beacon antenna 87; the secondary vehicle 303 includes a first transponder antenna 79 that is mounted forward with respect to the second transponder antenna 81. The primary transceiver antenna 77 and the first beacon antenna 87 are located at primary reference points on the primary vehicle 301. The first transponder antenna 79 and the second transponder antenna 81 are located at secondary reference points on the secondary vehicle 303.

The primary transceiver 15 transmits a first transmission signal (e.g., pulse or pulse train with a first signal identifier) to a first transponder 30 and a second transponder 34. As shown, the first transponder 30 transmits a return signal (e.g., a pulse or pulse train of second signal transmission with a second signal identifier) to the primary transceiver 15 and the second transponder 34 transmits another return signal (e.g., a pulse or pulse train of third signal transmission with a third signal identifier) to the primary transceiver 15. The first propagation time 302 is associated with the one-way trip or a two-way trip between the primary transceiver 15 and the first transponder 30. A second propagation time 304 is associated with the one-way trip or a two-way trip between the primary transceiver 15 and the second transponder 34. A first distance, which is proportional to the first propagation time 302, represents a distance between the primary transceiver antenna 77 and the first transponder antenna 79. A second distance, which is proportional to the second propagation time 304, represents a distance between the primary transceiver antenna 77 and the second transponder antenna 81.

Upon receipt of the first transmission signal, the first transponder 30 transmits a second transmission signal (e.g., pulse with a second signal identifier) to the primary transceiver 15 and the first beacon 39; the second transponder 34 transmits a third transmission signal (e.g., a pulse with a third signal identifier) to the primary transceiver 15 and the first beacon 39. The third propagation time 306 is associated with (a) the one-way trip between the primary transceiver 15 and the first beacon via 39 the first transponder 30 or (b) the one-way trip between the first transponder 30 and the first beacon 39. A third distance is proportional to the third propagation time 306. The fourth propagation time 308 is associated with (a) the one-way trip between the primary transceiver 15 and the first beacon 39 via the second transponder 34 or (b) the one-way trip between the second transponder 34 and the first beacon 39. A fourth distance is proportional to the fourth propagation time 308.

The primary transceiver 15 and the first beacon 39 may communicate with each other wirelessly or via a transmission line, fiber optics, coaxial cable, an Ethernet link, or another configuration. The propagation delay associated with the transmission line may be measured or predetermined for a given length of transmission line between the primary transceiver 15 and the first beacon 39 to compensate for the lag in the communication or processing thereof. In one embodiment, the first beacon 39 may communicate one or more of the following to the primary transceiver 15: (1) the transmission time elapsed from the transmitter 14 for the transmission of a transmission signal (e.g., pulse) with a particular corresponding signal identifier, (2) the receipt time at the first beacon 39 for the receipt of the transmissions of a transmission signal with a particular corresponding signal identifier, (3) both the transmission time from the primary transceiver 15 and the receipt time at the first beacon, and (4) a difference between the transmission time and the receipt time to the first beacon 39. The primary vehicle electronics (10 or 110) and the secondary vehicle electronics (26 or 126) may require precision oscillators or clocks that are synchronized with the exchange or synchronization data to properly evaluate and judge the foregoing transmission time, receipt time, time difference, and any other propagation time between the secondary vehicle electronics 26 and the primary vehicle electronics 10.

The primary vehicle 301 has a primary heading 331 and the secondary vehicle has a secondary heading 333. The difference or differential angle (a) between the primary heading and the secondary heading may comprise an error signal or error datum that is used to guide the primary vehicle, the secondary vehicle, or both. Further, each vehicle may have (1) an absolute position and absolute heading or (2) a relative position and relative heading with respect to the other vehicle. The absolute position or a relative position may be determined with respect to a reference point on the vehicle (e.g., geometric center or center of gravity or the positions of the antennas (77, 79, 87 and 81). The absolute or relative heading may be determined with reference to a reference heading or reference bearing (e.g., due North or magnetic North).

Figure 4:
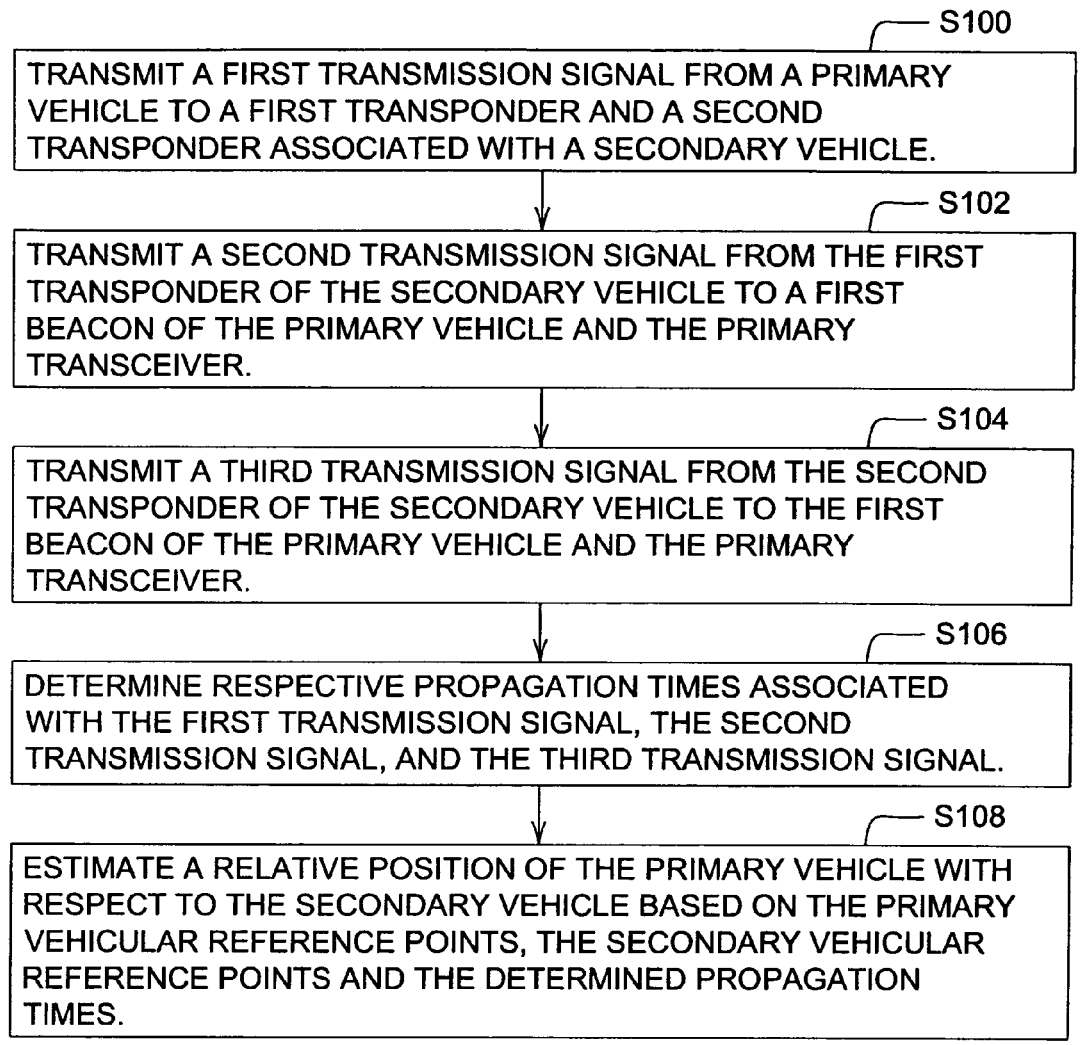
FIG. 4 is a flow chart of one embodiment of a method for determining the relative position (and orientation) of a primary vehicle with respect to a secondary vehicle.

FIG. 4 illustrates a method for determining the relative position and orientation of a primary vehicle with respect to a secondary vehicle. The method of FIG. 4 begins with step S100.

In step S100, a primary transceiver 15 or transmitter transmits a first transmission signal from a primary vehicle to a first transponder 30 and a second transponder 34 associated with a secondary vehicle. The first transmission may comprise an identifiable pulse and may be coded with a first signal identifier to indicate its source, its destination or both. The first transmission signal may be modulated with a coded signal (e.g., pseudo-random noise code), a pulse, a pulse train, phase shift keying, amplitude shift keying, frequency shift keying, pulse width modulation, pulse amplitude modulation, pulse phase modulation, or any other suitable modulation scheme. A first transponder antenna 79 and a second transponder antenna 81 are associated with secondary vehicular reference points (e.g., two dimensional or three dimensional spatial coordinates on the secondary vehicle) that are spaced apart from each other.

In step S102, a first transponder 30 of the secondary vehicle transmits a second transmission signal from the first transponder 30 of the secondary vehicle to a first beacon 39 of the primary vehicle and the primary transceiver 15. For example, upon receipt of the first transmission signal, the first transponder 30 transmits a second transmission signal with a second signal identifier to a first beacon 39 of the primary vehicle and the primary transceiver 15. A primary transceiver antenna 77 and a first beacon antenna 87 are associated with primary vehicular reference points that are spaced apart from each other.

In step S104, a second transponder 34 of the secondary vehicle transmits a third transmission signal from the second transponder 34 of the secondary vehicle to the first beacon 39 of the primary vehicle and the primary transceiver 15. For example, upon receipt of the first transmission signal, the second transponder 34 transmits a third transmission signal with a third signal identifier to the first beacon 39.

In step S106, a data processor determines respective propagation times associated with the first transmission signal, the second transmission signal, and the third transmission signal. For example, a data processor or estimator determines (1) a first propagation time associated with the first transmission signal between the primary transceiver antenna 77 and the first transponder antenna 79, (2) a second propagation time associated with the first transmission signal between the primary transceiver antenna 77 and the second transponder antenna 81; (3) a third propagation time associated with the second transmission signal between the first transponder 30 and the first beacon 39; (4) a fourth propagation time associated with the third transmission signal between the second transponder 34 and the primary transceiver 15.

The first propagation time may comprise a round-trip or a two-way propagation time that includes an outbound propagation time between the primary transceiver 15 and the first transponder 30 and an inbound propagation time between the first transponder 30 and the primary transceiver 15. Similarly, the second propagation time may comprise a round-trip or a two-way propagation time that includes an outbound propagation time between the primary transceiver 15 and the second transponder 34 and an inbound propagation time between the second transponder 34 and the primary transceiver 15. For instance, the first propagation time comprises a propagation time between the transmission time at the transmitter and a reception time at the first transponder 30, and the second propagation time comprises a propagation time between the transmission time at the transmitter and a reception time at the second transponder 34.

In step S108, an estimator 18 estimates a relative position of the primary vehicle with respect to the secondary vehicle based on the primary vehicular reference points, the secondary vehicular reference points and the determined propagation times. For example, the data processor (16 or 116) or an estimator 18 estimates a relative position of the primary vehicle with respect to the secondary vehicle based on the primary vehicular reference points, the secondary vehicular reference points, the determined first propagation time, the second propagation time, and at least one of the third propagation time and the fourth propagation time.

In certain applications, the primary vehicle and the secondary vehicle may travel in relatively close proximity to one another. Close proximity may be as few as 20 centimeters of separation for vehicles traveling at lower speeds and as great as 10 meters of separation for vehicles traveling at higher speeds. In order to safely detect and avoid collisions, the relative position and orientation measurements are typically collected at regular (e.g., periodic) intervals at a sufficiently high frequency (e.g., greater than or equal to 100 Hertz). The high frequency may exceed the maximum frequency of a typical location-determining receiver (e.g., Global Positioning System receiver with differential correction).

Figure 5:
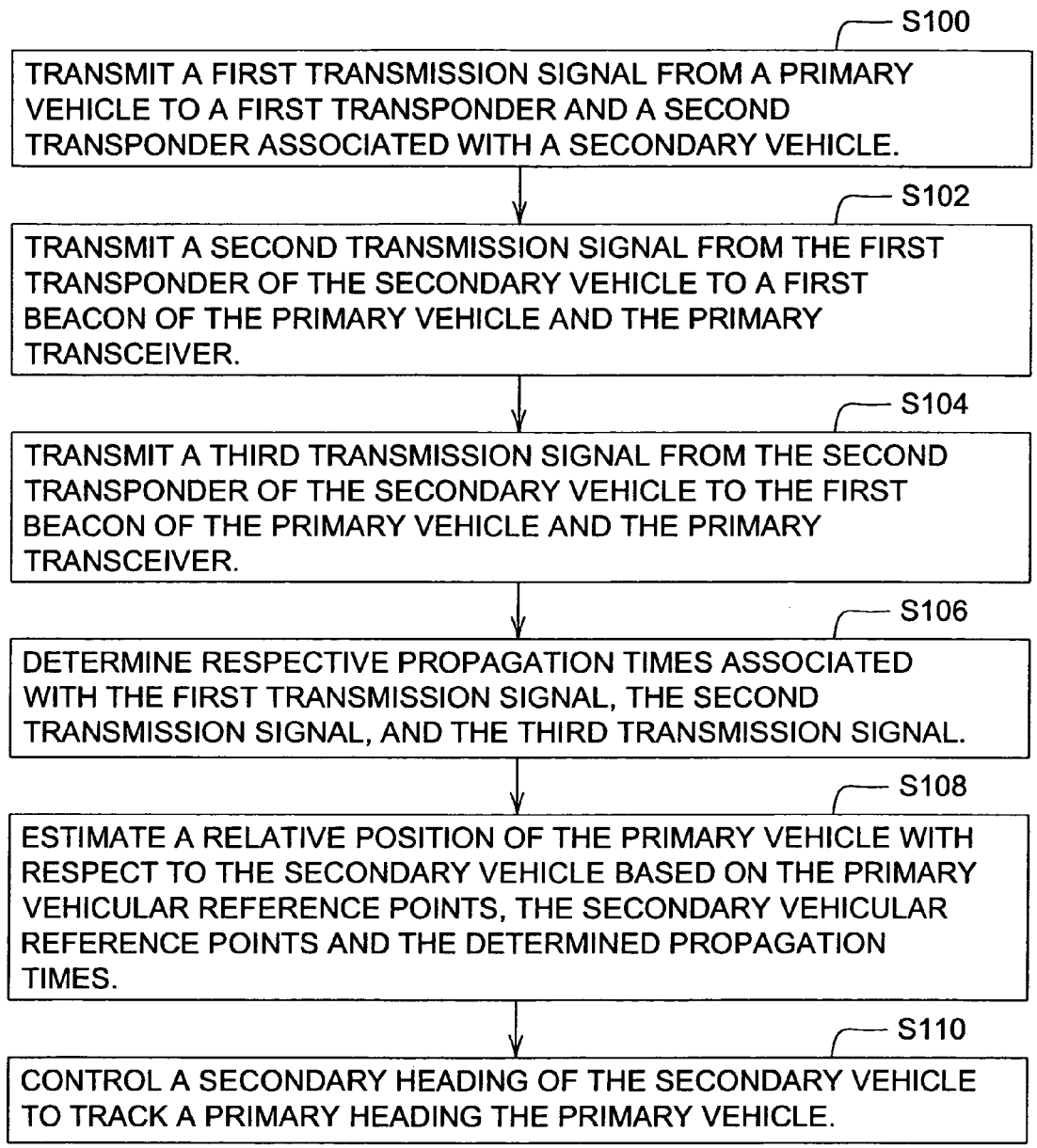
FIG. 5 is a flow chart of another embodiment of a method for determining the relative position and orientation of a primary vehicle with respect to a secondary vehicle.

The method of FIG. 5 is similar to the method of FIG. 4, except the method of FIG. 5 further comprises step S110. Like reference numbers in FIG. 4 and FIG. 6 indicate like elements or like procedures.

In step S110, after step S108, a vehicle controller (e.g., secondary vehicle controller) controls a secondary heading of the secondary vehicle to track a primary heading the primary vehicle. Accordingly, if the primary vehicle and secondary vehicle are in a side-by-side spatial arrangement, the primary vehicle and the secondary vehicle will not collide or cross paths if the vehicular velocity, angular velocity, acceleration and the vehicular heading are approximately the same or within some maximum tolerance based on the spatial separation between the primary vehicle and secondary vehicle (e.g., with reference to one or more reference points on each vehicle).

Step S110 may be supplemented in accordance with various techniques that may be applied separately or cumulatively. In addition to controlling relative vehicular headings of the vehicles, the control of vehicular positions and orientations may consider the following supplemental techniques. Under a first technique, the primary vehicle controller 40, the secondary vehicle controller 41, or both control a lateral separation between the primary vehicle and the secondary vehicle to meet or exceed a minimum lateral spatial separation (e.g., 20 centimeters).

Under a second technique, the data processor (16 or 116) estimates the relative positions and angular heading of the primary vehicle and secondary vehicle at an update frequency of at least 100 Hertz to facilitate collision avoidance between the primary vehicle and the secondary vehicle.

Under a third technique, the primary vehicle controller 40 and the secondary vehicle controller 41 may cooperate to designate the secondary vehicle to follow the primary vehicle during a first mode and to designate the primary vehicle to follow the secondary vehicle during a second mode. The change from the first mode to the second mode may be triggered by an event associated with the failure, reliability or damage of a component (e.g., a signal or data output of a vehicular sensor) on the primary vehicle or the secondary vehicle. For example, if the primary vehicle has a critical component failure and the vehicles are operating in the first mode, the primary vehicle controller 40 may transmit a signal to the secondary vehicle controller 41 to switch to the second mode via the first wireless communications device 24 and the second wireless communications device 36.

Figure 6:
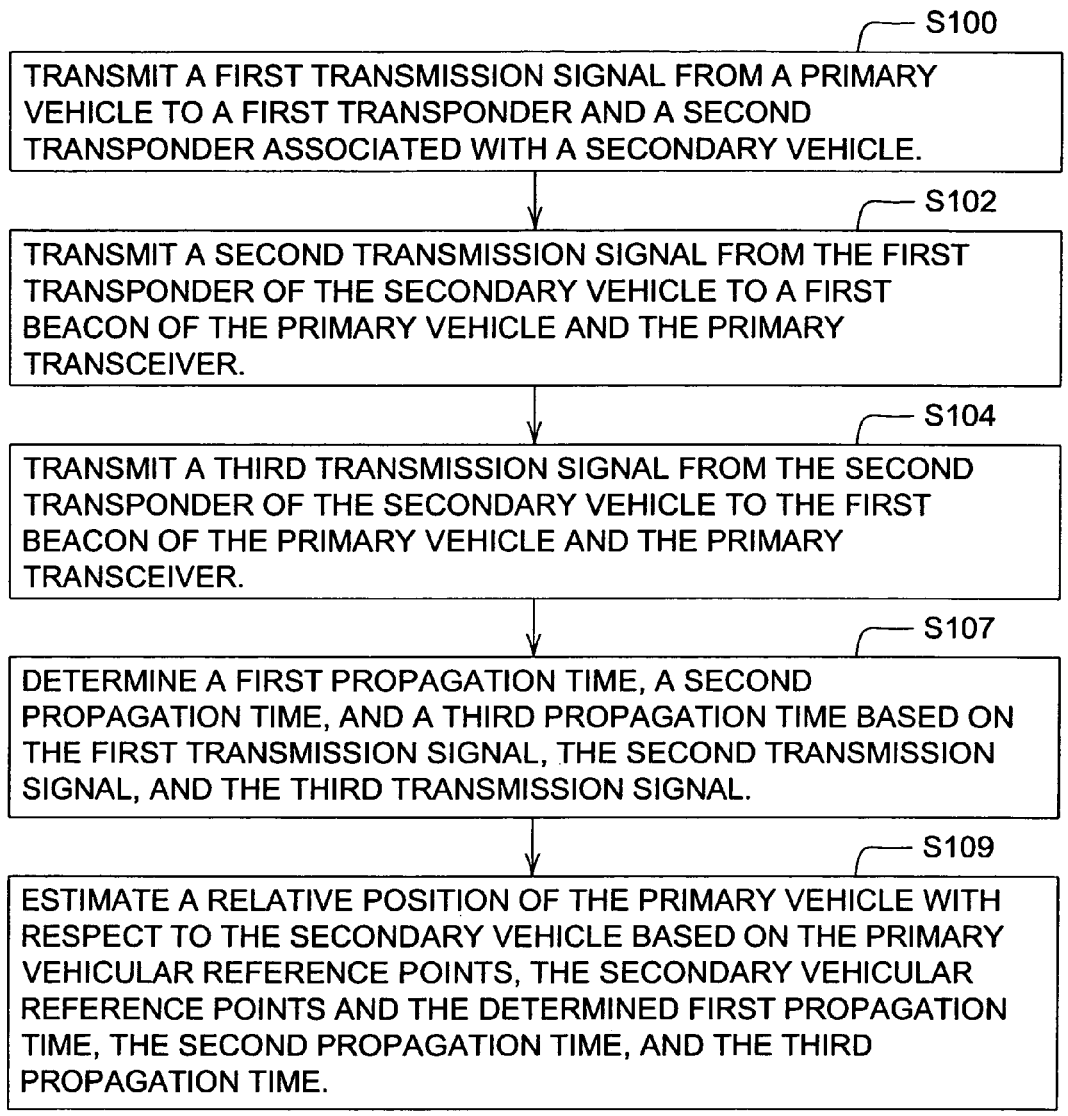
FIG. 6 is a flow chart of yet another embodiment of a method for determining the relative position and orientation of a primary vehicle with respect to a secondary vehicle.

The method of FIG. 6 is similar to the method of FIG. 4, except steps S106 and S108 are replaced by steps S107 and S109 of FIG. 6. Like reference numbers in FIG. 4 and FIG. 6 indicate like steps or procedures.

In step S107 after step S104, the data processor (16 or 116) determines a first propagation time, a second propagation time, and a third propagation time based on the first transmission signal, the second transmission signal, and the third transmission signal.

In step S109, the data processor (16 or 116) or estimator 18 estimates a relative position of the primary vehicle with respect to the secondary vehicle based on the primary vehicular reference points, the secondary vehicular reference points, and the determined first propagation time, the second propagation time, and the third propagation time.

Figure 7:
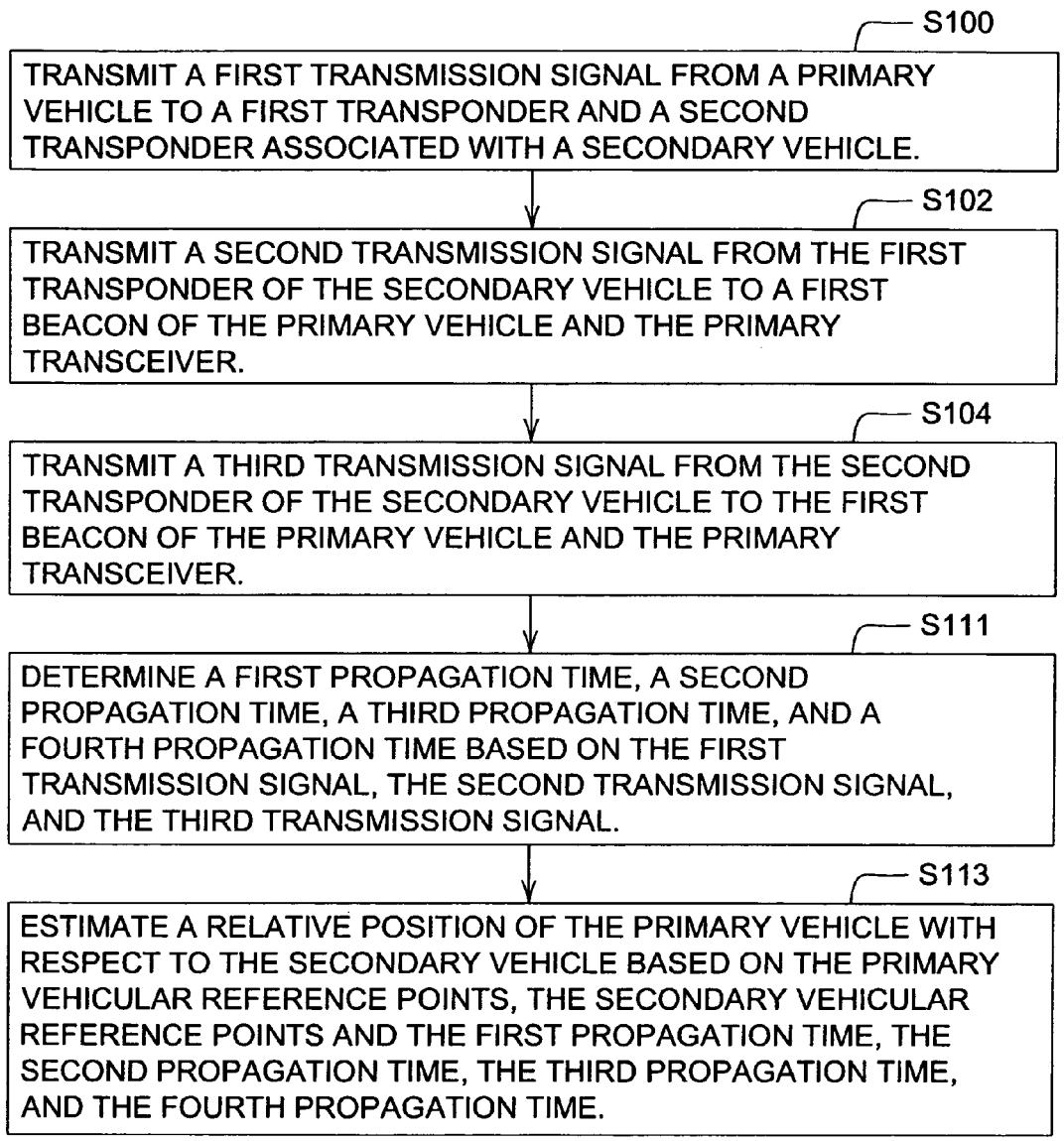
FIG. 7 is a flow chart of still another embodiment of a method for determining the relative position (and orientation) of a primary vehicle with respect to a secondary vehicle.

The method of FIG. 7 is similar to the method of FIG. 4, except steps S106 and S108 are replaced with step S11 and S113, respectively. Like reference numbers in FIG. 4 and FIG. 7 indicate like steps or procedures.

In step S111 after step S104, the data processor (16 or 116) determines a first propagation time, a second propagation time, a third propagation time, and a fourth propagation time based on the first transmission signal, the second transmission signal, and the third transmission signal.

In step S113, the data processor (16 or 116) or estimator 18 estimates a relative position of the primary vehicle with respect to the secondary vehicle based on the primary vehicle reference points, the secondary vehicle reference points, the first propagation time, the second propagation time, third propagation time, and the fourth propagation time.

Figure 8:
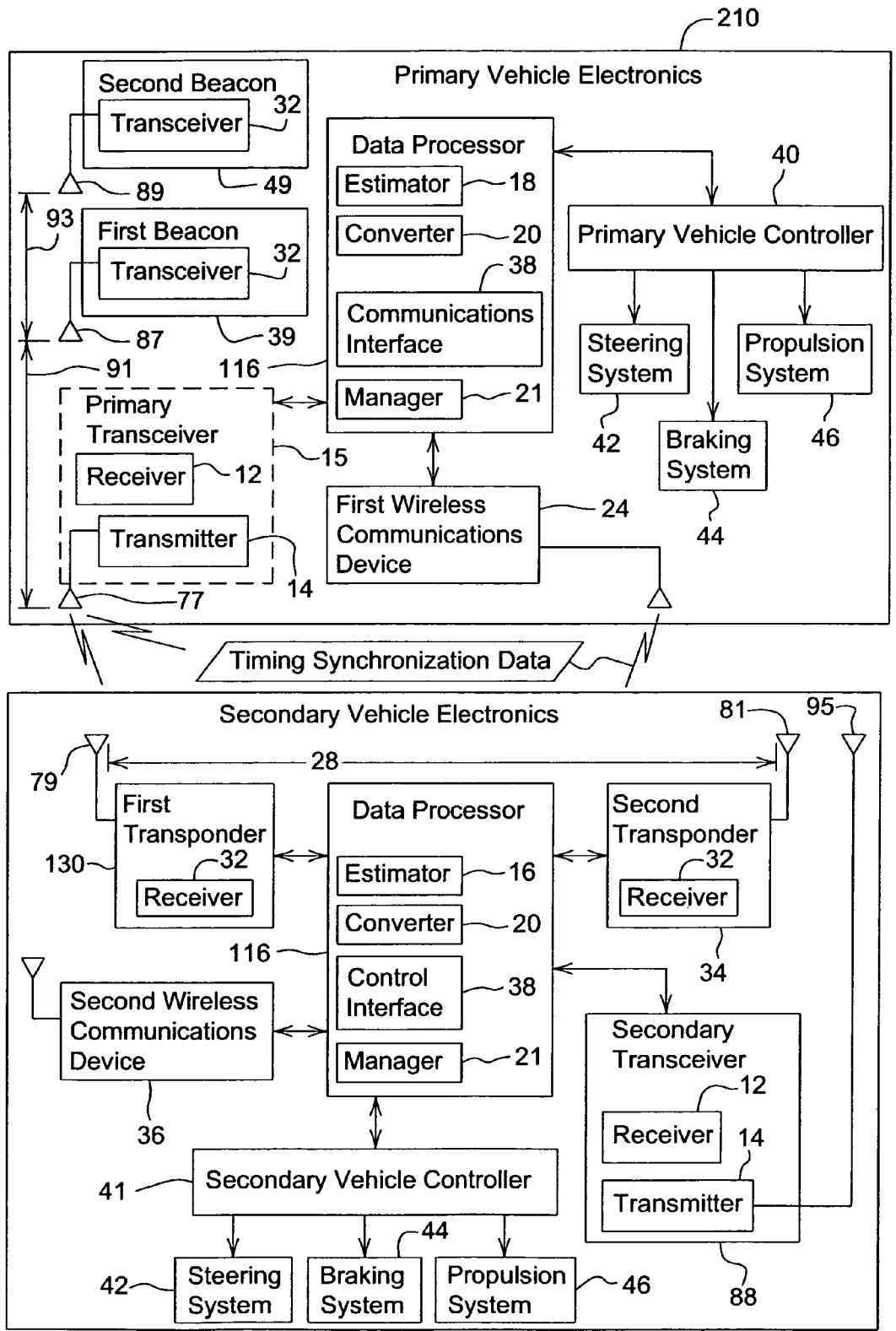
FIG. 8 is a block diagram of another embodiment of a system for determining the relative position (and orientation) of a primary vehicle with respect to a secondary vehicle.

The system 211 of FIG. 8 is similar to the system 111 of FIG. 2, except the primary electronics 210 further comprises a second beacon 49 and the secondary electronics 226 includes different components. Like reference numbers in FIG. 1, FIG. 2 and FIG. 8 indicate like elements.

The second beacon 49 comprises a transceiver 32 or the combination of a transmitter and a receiver. The first beacon antenna 87 and the second beacon antenna 89 are spaced apart by a known spatial separation 93.

The secondary vehicle electronics 226 comprises a first transponder 30, a second transponder 34, secondary transceiver 88, and a data processor 116. The first transponder 30 and the second transponder 34 each include a transceiver 32, which is coupled to the data processor 116.

The secondary transceiver 88 comprises a receiver 12 and transmitter 14. The secondary transceiver 88 fulfills a similar role to that of the primary transceiver 15, but is designated the secondary transceiver 88 because it resides or is associated with the secondary vehicle. A composite propagation time between any three antennas may be estimated by decomposing the composite propagation time into two constituent propagation times between the three antennas with due consideration of any bias or delay for processing within any intermediary beacon or transponder.

The data processor 116 comprises an estimator 18, a converter 20, a communications interface 38, and a manager 21. The presence of the data processor 116 at the primary vehicle and the secondary vehicle supports the estimation of one-way propagation times or two-way propagation times at either vehicle, or both. A first wireless communications device 24 and the second wireless communication device 36 may exchange any of the following: (a) timing synchronization data, (b) data that facilitates estimation of a one-way propagation time between the primary vehicle electronics 210 and the secondary vehicle electronics 226, and (c) one-way propagation times or two-way propagation times between any two antennas (77, 87, 89, 79, and 81) of the primary vehicle or the secondary vehicle.

The data processor 116 at the primary vehicle and the secondary vehicle allows either vehicle to determine its relative position with respect to the other vehicle or its relative heading with respect to the other vehicle. Further, both the primary vehicle electronics 210 and the secondary vehicle electronics 226 of FIG. 8 allow either vehicle to be the lead vehicle or follower vehicle, consistent with the supplemental techniques of step S110 in FIG. 5 or otherwise. The lead vehicle and the follower vehicle may change roles from time to time, after a time period, or after a triggering event occurs (e.g., a vehicular sensor indicates damage to the lead vehicle or an evasive maneuver required in military operations or obstacle avoidance maneuver in other settings).

In the data processor 116 in either vehicle, the converter 20 may convert the first propagation delay and the second propagation delay into a first distance and a second distance, respectively for subsequent processing into control data. The manager 21 can use temporal data or distance data to develop management or control data for the secondary vehicle controller 41.

Figure 9:
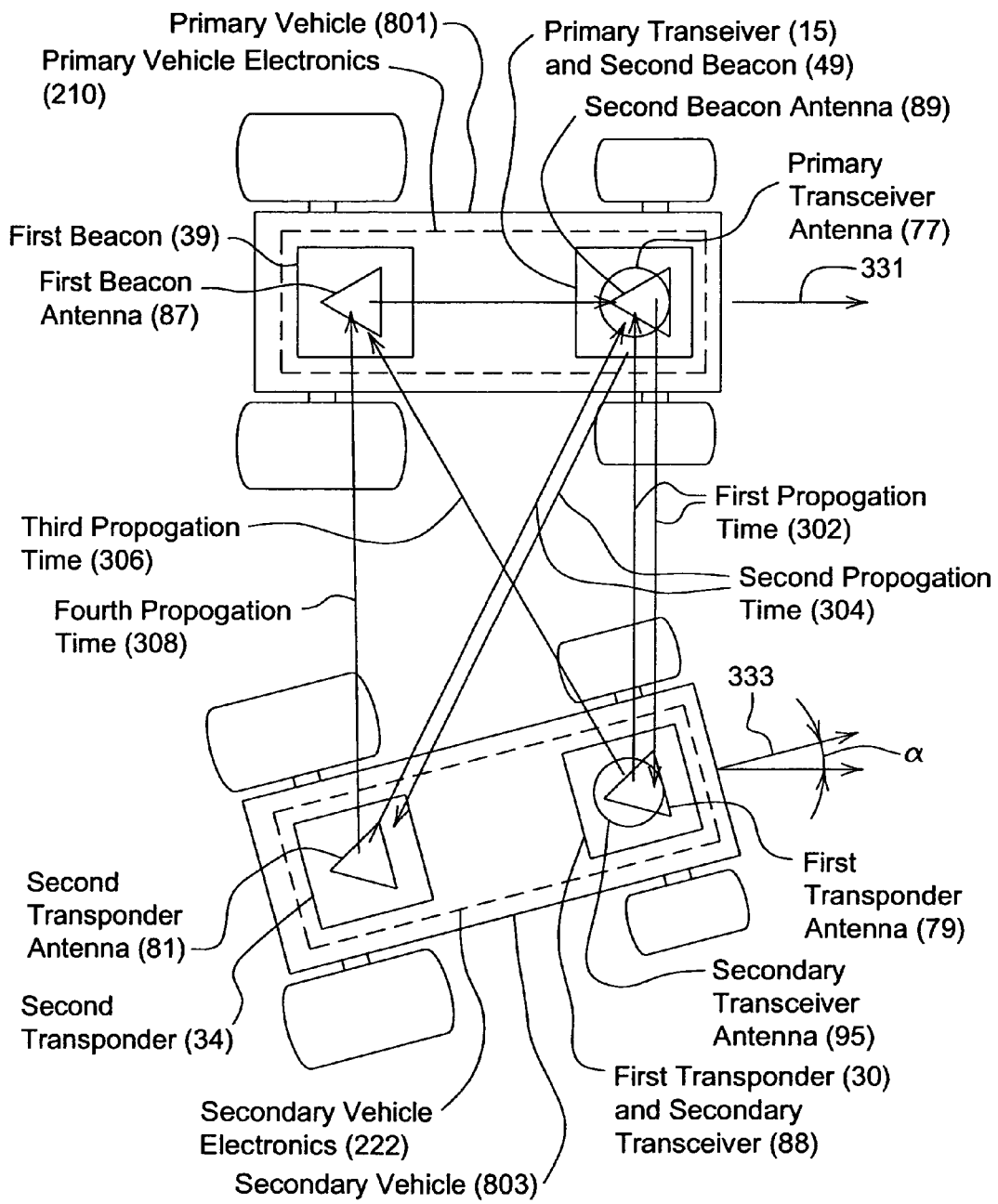
FIG. 9 is an illustrative diagram of a top view of a secondary vehicle generally tracking a path of a primary vehicle, consistent with the system of FIG. 8.

The diagram of FIG. 9 is similar to the diagram of FIG. 3, except that the diagram of FIG. 9 is consistent with the system 211 of FIG. 8. Like reference numbers in FIG. 3, FIG. 8, and FIG. 9 indicate like elements.

The primary vehicle 801 of FIG. 9 includes a second beacon 49 and a second beacon antenna 89. The secondary vehicle 803 includes a secondary transceiver 88 and a secondary transceiver antenna 95. The second beacon 49 and the secondary transceiver 88 allows the secondary vehicle 803 to switch roles with the primary vehicle 801.

As shown in FIG. 9 the primary vehicle 801 and the secondary vehicle 803 are operating in the first mode, with the secondary vehicle 803 following the primary vehicle 801. However, the primary vehicle 801 follows the secondary vehicle 803, if the vehicles operate in the second mode. In the second mode, the second transceiver 88 takes on the analogous role of the primary transceiver 88 in the first mode; and the first beacon 39 and second beacon 49 take on the analogous roles of the first transponder 30 and the second transponder 34 in the first mode, respectively.

Having described the preferred embodiment, it will become apparent that various modifications can be made without departing from the scope of the invention as defined in the accompanying claims.

The secondary is claimed:

1. A method for determining the relative position of a primary vehicle with respect to a secondary vehicle, the method comprising:
   transmitting a first transmission signal from a primary transceiver of a primary vehicle to a first transponder and a second transponder associated with a secondary vehicle, a first transponder antenna and a second transponder antenna are associated with secondary vehicular reference points that are spaced apart from each other;
   transmitting a second transmission signal from the first transponder of the secondary vehicle to a first beacon of the primary vehicle and the primary transceiver, a primary transceiver antenna and a first beacon antenna associated with primary vehicular reference points that are spaced apart from each other;
   transmitting a third transmission signal from the second transponder of the secondary vehicle to the first beacon of the primary vehicle and the primary transceiver;
   determining respective propagation times associated with the first transmission signal, the second transmission signal, and the third transmission signal; and
   estimating a relative position of the primary vehicle with respect to the secondary vehicle based on the primary vehicular reference points, the secondary vehicular reference points and the determined propagation times.

2. The method according to claim 1 wherein the determining of the respective propagation times comprises determining a first propagation time associated with (a) the first transmission signal between the primary transceiver antenna and the first transponder antenna, (b) a second propagation time associated with the first transmission signal between the primary transceiver antenna and the second transponder antenna; (c) a third propagation time associated with the second transmission signal between the first transponder and the first beacon; (d) a fourth propagation time associated with the third transmission signal between the second transponder and the first beacon.

3. The method according to claim 2 wherein the estimating further comprises estimating a relative position of the primary vehicle with respect to the secondary vehicle based on the primary vehicular reference points, the secondary vehicular reference points, the determined first propagation time, the second propagation time, and at least one of the third propagation time and the fourth propagation time.

4. The method according to claim 1 further comprising:
   controlling a secondary heading of the secondary vehicle to generally track a primary heading of the primary vehicle.

5. The method according to claim 1 further comprising:
   controlling a lateral separation between the primary vehicle and the secondary vehicle to meet or exceed a minimum lateral spatial separation.

6. The method according to claim 1 further comprising:
   estimating the relative positions and angular heading of the primary vehicle and secondary vehicle at an update frequency of at least 100 Hertz to facilitate collision avoidance between the primary vehicle and the secondary vehicle.

7. The method according to claim 1 further comprising:
   designating the secondary vehicle to follow the primary vehicle during a first mode;
   designating the primary vehicle to follow the secondary vehicle during a second mode.

8. The method according to claim 1 wherein in the estimating the first propagation time and the second propagation establish a radius of the secondary vehicle with respect to the primary vehicle, and wherein the third propagation time establishes an indicator of an azimuth of the secondary vehicle with respect to the primary vehicle.

9. The method according to claim 1 wherein first propagation time comprises a propagation time between the transmission time at the transmitter and a reception time at the first transponder, and wherein the second propagation time comprises a propagation time between the transmission time at the transmitter and a reception time at the second transponder.

10. The method according to claim 9 further comprising:
converting the first propagation time and the second propagation time into a first distance and a second distance, respectively.

11. A system for determining the relative position of a primary vehicle with respect to a secondary vehicle, the system comprising:
a primary transceiver for transmitting a first transmission signal from a primary transceiver of a primary vehicle to a first transponder and a second transponder associated with a secondary vehicle, a first transponder antenna and a second transponder antenna are associated with secondary vehicular reference points that are spaced apart from each other;
a first transponder for transmitting a second transmission signal from the first transponder of the secondary vehicle to a first beacon of the primary vehicle and the primary transceiver, a primary transceiver antenna and a first beacon antenna associated with primary vehicular reference points that are spaced apart from each other;
a second transponder for transmitting a third transmission signal from the second transponder of the secondary vehicle to the first beacon of the primary vehicle and the primary transceiver;
an estimator for determining respective propagation times associated with the first transmission signal, the second transmission signal, and the third transmission signal; and
a data processor for estimating a relative position of the primary vehicle with respect to the secondary vehicle based on the primary vehicular reference points, the secondary vehicular reference points and the determined propagation times.

12. The system according to claim 11 wherein the estimator determines the respective propagation times as a first propagation time associated with (a) the first transmission signal between the primary transceiver antenna and the first transponder antenna, (b) a second propagation time associated with the first transmission signal between the primary transceiver antenna and the second transponder antenna; (c) a third propagation time associated with the second transmission signal between the first transponder and the first beacon; (d) a fourth propagation time associated with the third transmission signal between the second transponder and the first beacon.

13. The system according to claim 12 wherein the data processor estimates a relative position of the primary vehicle with respect to the secondary vehicle based on the primary spatial separation, the secondary spatial separation, the determined first propagation time, the second propagation time, and at least one of the third propagation time and the fourth propagation time.

14. The system according to claim 11 further comprising:
a secondary vehicle controller is arranged to control a secondary heading of the secondary vehicle to generally track a primary heading of the primary vehicle.

15. The system according to claim 11 further comprising:
a secondary vehicle controller for controlling a lateral separation between the primary vehicle and the secondary vehicle to meet or exceed a minimum lateral spatial separation.

16. The system according to claim 11 wherein the data processor estimates the relative positions and angular heading of the primary vehicle and secondary vehicle at an update frequency of at least 100 Hertz to facilitate collision avoidance between the primary vehicle and the secondary vehicle.

17. The system according to claim 11 further comprising a primary vehicular controller and a secondary vehicle controller designating the secondary vehicle to follow the primary vehicle during a first mode and designating the primary vehicle to follow the secondary vehicle during a second mode.

18. The system according to claim 11 wherein in the data processor estimates the first propagation time and the second propagation establish a radius of the secondary vehicle with respect to the primary vehicle, and wherein the third propagation time establishes an indicator of an azimuth of the secondary vehicle with respect to the primary vehicle.

19. The system according to claim 11 wherein the data processor estimates the first propagation time comprising a propagation time between the transmission time at the transmitter and a reception time at the first transponder, and the second propagation time comprising a propagation time between the transmission time at the transmitter and a reception time at the second transponder.

20. The system according to claim 19 further comprising a converter for converting the first propagation time and the second propagation time into a first distance and a second distance, respectively.

* * * * *